United States Patent
Pomerleau (10) Patent No.: US 7,795,184 B2
(45) Date of Patent: Sep. 14, 2010

(54) COMPOSITIONS AND METHODS FOR PREPARING DOWNHOLE DRILLING FLUIDS

(75) Inventor: Daniel Guy Pomerleau, Calgary (CA)

(73) Assignee: Engineered Drilling Solutions, Inc., Calgary, Alberta (CA)

(*) Notice: Subject to any disclaimer, the term of this patent is extended or adjusted under 35 U.S.C. 154(b) by 0 days.

(21) Appl. No.: 12/475,847

(22) Filed: Jun. 1, 2009

(65) Prior Publication Data

US 2009/0291860 A1 Nov. 26, 2009

Related U.S. Application Data

(63) Continuation of application No. 11/486,984, filed on Jul. 14, 2006, now Pat. No. 7,541,317.

(60) Provisional application No. 60/669,634, filed on Jul. 15, 2005, provisional application No. 60/718,852, filed on Sep. 20, 2005.

(51) Int. Cl.
C09K 8/20 (2006.01)
C09K 8/60 (2006.01)
C09K 8/36 (2006.01)
C09K 8/524 (2006.01)
C09K 8/64 (2006.01)

(52) U.S. Cl. ............ 507/104; 507/138; 507/140; 507/204; 507/263; 507/265; 507/267; 507/270

(58) Field of Classification Search ............ 507/204, 507/104, 138, 140, 263, 265, 267
See application file for complete search history.

(56) References Cited

U.S. PATENT DOCUMENTS

| 2,691,629 A | 10/1954 | Stoner ............ 252/8.5 |
| 4,439,328 A | 3/1984 | Moity |
| 4,619,772 A * | 10/1986 | Black et al. ............ 507/104 |
| 4,631,136 A | 12/1986 | Jones, III |
| 5,076,944 A | 12/1991 | Cowan et al. |
| 5,102,866 A * | 4/1992 | Forrest ............ 507/104 |
| 5,118,664 A | 6/1992 | Burts, Jr. |
| 5,147,852 A | 9/1992 | Cowan et al. |
| 5,332,724 A * | 7/1994 | Burts, Jr. ............ 507/104 |
| 5,484,028 A * | 1/1996 | Rose ............ 175/72 |
| 5,599,776 A | 2/1997 | Burts, Jr. |
| 5,707,940 A | 1/1998 | Bush et al. |
| 5,763,367 A | 6/1998 | Burts, Jr. |
| 5,861,362 A | 1/1999 | Mayeux et al. |
| 5,909,779 A | 6/1999 | Patel et al. |
| 5,977,030 A | 11/1999 | House |
| 6,210,742 B1 * | 4/2001 | Deckers et al. ............ 426/630 |
| 6,323,158 B1 | 11/2001 | Burts, Jr. |
| 6,750,179 B1 | 6/2004 | Burts, Jr. |
| 6,825,152 B2 | 11/2004 | Green |
| 6,849,581 B1 | 2/2005 | Thompson et al. |
| 2004/0014609 A1 | 1/2004 | Dalmazzone et al. |
| 2004/0023816 A1 | 2/2004 | Burts, III |
| 2004/0063587 A1 | 4/2004 | Horton et al. |

OTHER PUBLICATIONS

International Search Report for PCT/CA2006/001973 dated Aug. 10, 2007.

* cited by examiner

*Primary Examiner*—Timothy J. Kugel
*Assistant Examiner*—Atnaf Admasu
(74) *Attorney, Agent, or Firm*—Heslin Rothenberg Farley & Mesiti P.C.; Victor A. Cardona (57) ABSTRACT

A method of altering the properties of a drilling fluid includes adding effective amounts of crushed or whole oilseeds or mixtures of crushed or whole oilseeds to a drilling fluid. The crushed or whole oilseeds or mixture of crushed or whole oilseeds are selected to impart any one of or a combination of effects including but not limited to: an increase in drilling fluid emulsion stability in oil-based or invert emulsion fluids, decreased specific gravity of the drilling fluid, seepage loss control, filtration control, oil wetting and deflocculation/dispersion, of entrained solids and/or reduced torque and drag of the drilling string.

55 Claims, 3 Drawing Sheets

COMPOSITIONS AND METHODS FOR PREPARING DOWNHOLE DRILLING FLUIDS

CROSS-REFERENCE TO RELATED APPLICATIONS

This application is a Continuation of U.S. Ser. No. 11/486,984, filed Jul. 14, 2006, which claims the benefit of U.S. Provisional Application Ser. No. 60/699,634, filed Jul. 15, 2005 and U.S. Provisional Application Ser. No. 60/718,852, filed Sep. 20, 2005, now U.S. Pat. No. 7,541,317, the entire disclosures of which are incorporated herein by reference.

FIELD OF THE INVENTION

The invention provides a method of altering the properties of a drilling fluid by adding effective amounts of crushed or whole oilseeds or mixtures of crushed or whole oilseeds to a drilling fluid. The crushed or whole oilseeds or mixture of crushed or whole oilseeds are selected to impart any one of or a combination of effects including but not limited to: an increase in drilling fluid emulsion stability in oil-based or invert emulsion fluids, decreased specific gravity of the drilling fluid, seepage loss control, filtration control, oil wetting and deflocculation/dispersion of entrained solids and/or reduced torque and drag of the drilling string.

BACKGROUND OF THE INVENTION

Drilling fluid circulating systems are employed during downhole drilling operations to provide a number of functions. These functions include providing cooling to the drill bit, removing drilled cuttings to the surface and providing a hydrostatic head to the formation to prevent the escape of oil and gas from the well.

As is well known, in almost all drilling operations, drilling fluid is continuously lost to the formation during the drilling process due to seepage of the drilling fluid into the formations. Seepage will occur at varying rates depending on the relative porosity or fractures of the formation and the hydrostatic head pressure. While some seepage will always occur, generally it is necessary to control drilling fluid loss in order to ensure effective drilling fluid circulation and to reduce drilling fluid costs. Notwithstanding efforts to prevent drilling fluid losses, tens of thousands of cubic meters of these fluids are lost each year.

There are generally two classes of drilling fluids namely water-based and oil-based drilling fluids. Water-based drilling fluids are generally less expensive than oil-based drilling fluids but cannot be used effectively in all formations and may result in operational problems in certain formations such as hydratable shales, silts or clays. In these formations, there is a tendency for the hydratable materials to destabilize the wellbore as well as disperse within the drilling fluid. The dispersion effect causes substantial increases in the solids content of the drilling fluid and leads to various problems including solids separation difficulties at the surface and detrimental increases to the viscosity of the fluid.

In order to overcome these difficulties associated with water-based drilling fluids, drilling fluids comprised of oil or water-in-oil (a.k.a invert emulsions) are often used. Generally, emulsion compositions in which oil remains the predominant or continuous phase are preferred. In order to maintain effective and stable emulsions, the compositions will require the use of emulsifiers to stabilize the emulsion. Such emulsions are effective in stabilizing hydratable shale or clay formations.

It is also well known that seepage losses can be mitigated through the addition of fibrous materials into the drilling fluid such as sawdust, fabrics, nut hulls, seed hulls and minerals such as ground limestone. These materials can bridge the various loss zones where fluids are being lost by mixing with drilled cuttings, and "viscosifiers" to create a "filter-cake" that may significantly reduce fluid losses to the formation. Examples of the use of various plant derived components as drilling fluid additives include U.S. Pat. No. 6,323,158, U.S. Pat. No. 5,763,367, U.S. Pat. No. 5,599,776, U.S. Pat. No. 2,691,629, U.S. Pat. No. 6,750,179, U.S. Pat. No. 4,439,328, U.S. Pat. No. 5,076,944, U.S. Pat. No. 5,861,362, United States Patent 2004/0014609 and United States Patent Applications 2004/0063587 and 2004/00232816. In the past, any plant materials have generally been preprocessed to remove any oils and gums associated with the plant material.

Typically, these materials also have a detrimental effect on the drilling fluid and may significantly change the properties of the fluid by increasing viscosity to unmanageable levels or de-stabilizing the emulsion. These effects directly impact the efficiency of surface pumping and solids removal equipment as well as causing wellbore destabilization. In the particular case of fibrous and granular materials including but not limited to cardboard, nut shells, calcium carbonate, and sawdust, within invert emulsions, these materials will be broken down over time to smaller sizes resulting in an increase in the relative surface area of these materials within the emulsion. The net effect of this size breakdown and the hydrophilic nature of these materials will contribute to the breakdown of the emulsion. As a result, over time, additional emulsifiers and oil-wetting agents must be added to the emulsions to maintain the emulsion properties, which again contribute to the cost of the drilling fluid. In the specific case of adding limestone or other mineral based seepage control agents to the drilling fluid, the specific gravity of the drilling fluid is also increased which increases the hydrostatic pressure within the wellbore which may directly increase the seepage losses and also requires stronger pumping equipment.

Other functional requirements of drilling fluids, problems that may be encountered with the use of drilling fluids and past solutions are briefly discussed below:

Drilling fluid systems also require the use of torque reducing and drag reducing agents to relieve both rotational twist that builds up in the drilling pipe during rotation and the frictional forces required to lift the drill string from the borehole through the drilling fluid. In the past, the use of spherical media such as glass beads, Teflon beads, styrene-divinylbenzene copolymer beads, walnut hulls, and oil based additives (petroleum or vegetative) within the drilling fluid have demonstrated the ability of these additives to relieve rotational twist and reduce drag.

Drilling fluids also preferably require materials to disperse entrained drilled solids that build up in the drilling fluid system during the excavation process. In many systems, the materials used are surfactants and phenolic compounds including lignins and tannins.

Filtration control agents may be added to both water and oil-based drilling fluids to reduce the penetration of the drilling fluid into formation rock media. The addition of colloidal, polymeric and colloid dispersing chemicals like surfactants, emulsifiers, lignite and/or lignosulphonate materials may be used.

In both oil and water based drilling fluids, emulsifiers may be added to aid the emulsification of oils added to water based fluids and water added to oil-based fluids. Emulsifiers also act as surfactants in both water based and oil based drilling fluids. Typically this effect is observed as a reduction in the viscosity of the treated fluid. The effect is caused by the adsorption of the emulsifier onto the surface of an entrained particle or emulsified phase component which enhances steric hindrance to flocculation between dispersed molecules. Generally, the addition of emulsifiers is dictated by the requirements of the fluid for the level of dispersion of secondary phase and/or entrained solids in the fluid system.

In the past, emulsifiers have been prepared using crude tall oil fatty acids (CTOFA) derived from Kraft pulp-making processes. CTOFA's are often used as the source of fatty acids for creating soaps/emulsifiers in oil-based drilling fluids. CTOFAs are normally considered to be a waste product and as a result, the price of CTOFAs is relatively low (in the range of $310/metric ton). The chemical composition of CTOFAs is primarily C18 oleic and linoleic acids in addition to relatively high concentrations of resins including abietic, dehydroabietic, palustric, isopalustric, isopimaric, neoabietic and pimaric acids. CTOFAs are very viscous and must typically be diluted with solvents in order to be efficiently mixed within a drilling fluid.

Some invert emulsions are blended with purified phospholipids to assist in oil wetting and dispersion of hydrophilic materials (drilled cuttings, barite and the like) which become entrained in the fluid. Purified phospholipids are used sparingly due to the high cost (typically in the range of $1000/ton).

In comparison, oil seeds are characterized by a much wider range of fatty acids with chain lengths that typically range from C14-C24 and naturally contain phospholipids. Different oilseeds contain very different specific compositions of fatty acids and phospholipids. From a cost perspective whole or crushed oilseeds are also in the same range as CTOFAs. However, any purified oilseed fatty acid is expensive (in the range of $1000+/ton).

While many solutions to the requirements of drilling fluids have been provided, there continues to be a need for enhanced drilling fluid compositions, while maintaining functionality to effectively bridge fractures and other loss zones. In particular, there has been a need for drilling fluid compositions having lipophilic/oleophilic characteristics to assist in dispersing the drilling fluid as the drilling fluid is broken down. Still further, there has been a need for drilling fluid compositions with increased stability where the stability of the drilling fluid is enhanced through delayed release of emulsifying agents.

SUMMARY OF THE INVENTION

In accordance with the invention, there is provided a method of altering the properties of a drilling fluid comprising the step of adding an effective amount of crushed or whole oilseeds or a mixture of crushed or whole oilseeds to a drilling fluid, the crushed or whole oilseeds or mixture of crushed or whole oilseeds selected to impart any one of or a combination of: an increase in drilling fluid emulsion stability in oil-based or invert emulsion fluids, decreased specific gravity of the drilling fluid, seepage loss control, filtration control, oil wetting, deflocculation/dispersion of entrained solids, reduced drag and rotary torque reduction. Oilseeds may be selected from any one of or a combination of canola, flax, sunflower, cotton, castor, soya, hemp, sunflower, safflower, grape, palm kernel, lesquerella, corn, peanut, mustard, poppy, sorghum, and sesame seeds.

In one aspect of the invention, oilseeds are added to a concentration of 3-150 kg/m$^3$ of drilling fluid and in more specific embodiments, oilseeds are added to a concentration of 10-60 kg/m$^3$ of drilling fluid or 45 kg/m$^3$ of drilling fluid.

In one embodiment, whole oilseeds or a mixture of whole oilseeds are added to the drilling fluid immediately prior to circulating the drilling fluid downhole.

In accordance with another embodiment, the invention provides a method of stabilizing a drilling fluid emulsion comprising the step of adding an effective amount of whole oilseeds or a mixture of whole oilseeds to a drilling fluid emulsion.

BRIEF DESCRIPTION OF THE DRAWINGS

The invention is described by the following description and the drawings where.

DETAILED DESCRIPTION OF THE INVENTION

In accordance with the invention, drilling fluid compositions containing crushed or whole oilseeds are described in which the properties of the drilling fluids can be engineered based on the properties of crushed or whole oilseeds or mixtures of crushed or whole oilseeds. Fluid properties include but are not limited to an increase in drilling fluid emulsion stability in oil-based or invert emulsion fluids, decreased specific gravity of the drilling fluid, seepage loss control, filtration control, oil wetting, deflocculation/dispersion of entrained solids and reductions in torque and drag in the drillstring.

Within the context of the invention, filtration control is a measure of seepage control and is a measurable parameter based on the passage of drilling fluid through an engineered medium over a fixed period of time (as defined by the American Petroleum Institute). Filtration control is dramatically affected by the continuous phase viscosity and the ultrafine solids dispersed in the drilling fluid. Emulsion stability is determined by the size of emulsion droplets in the continuous phase as well as the degree of dispersion of molecular and ultrafine drilled solids as stabilized by any surfactant. Seepage loss is more concerned with macro size material. The sizing and optimization of seepage loss materials is described at great length in existing prior art.

Oilseeds including but not limited to canola, flax, sunflower, cotton, castor, soya, hemp, sunflower, safflower, grape, palm kernel, lesquerella, corn, peanut, mustard, poppy, sorghum, and sesame are representative examples of oilseeds that may be utilized in accordance with the invention to engineer the fluid properties of oil or water based drilling fluid emulsions.

Different oilseeds have different surface structural/mechanical properties and different chemical characteristics that can be utilized to impart various properties to a drilling fluid either as single component or as a mixture of seeds (crushed or whole). Spherical seeds and flax seeds exhibited the best reductions in torque and drag.

Structural/mechanical characteristics include the shape, size and surface texture of the seed and may be utilized to affect the viscosity of the drilling fluid and, in particular, the torque and drag reducing characteristics of the drilling fluid.

Chemical characteristics include the seed composition and in particular, the hydrocarbon composition of the seeds. The typical structural dimensions, shape and texture of flax, sesame, canola and mustard seeds are shown in Table 1.

TABLE 1

Typical Structural Dimensions, Shape and Texture of Select Oilseeds

| Oil Seed Components | Seed Type | | | |
|---|---|---|---|---|
| | Flax | Sesame | Canola | Mustard |
| | | Typical values | | |
| Size | 5 mm × 0.25 mm | 1 mm | 1.5 mm | 2 mm |
| Shape | Flat Tear | Flat Tear | Spherical | Spherical |
| Surface Texture | Glassy | Smooth | Smooth | Smooth |

Typical hydrocarbon properties of oil seeds and crude tall oil fatty acids are shown in Tables 2 and 2A.

TABLE 2

Typical Hydrocarbon Properties of Oil Seeds and Crude Tall Oil Fatty Acids (CTOFAs)

| Fatty acid | Canola | Castor | Lesquerella | Linseed | Maize | Mustard | Olive |
|---|---|---|---|---|---|---|---|
| C6:0 | | | | <0.1% | | | |
| C8:0 | | | | <0.1% | | | |
| C10:0 | | | | <0.1% | | | |
| C12:0 | | | | <0.1% | | | |
| C14:0 | 0.1% | | | <0.1% | | | |
| C14:1n-5cis | | | | | | | |
| C16:0 | 3.5% | | 1.3% | 6.3% | 11.4% | 2.8% | 8-21% |
| C16:1n-7cis | 0.2% | | 0.7% | 0.1% | 0.1% | 0.2% | 1-4% |
| C16:4n-3 | | | | | | | |
| C18:0 | 1.5% | | 2.1% | 4.1% | 1.9% | 1.5% | 1-6% |
| C18:1n-9cis (12-OH) | | 87.6% | | | | | |
| C18:1n-9cis | 60.1% | | 18.1% | 18.0% | 25.3% | 21% | 53-80% |
| C18:1n-7 | | | | | | | |
| C18:2n-6cis | 20.1% | | 9.3% | 16.0% | 60.7% | 21% | 2-24% |
| C18:3w6 | | | 14.0% | | | | |
| C18:3n-3cis | 9.6% | | | 57.0% | | 12.5% | 1-2% |
| C18:4n-3 | | | | | | | |
| C20:0 | 0.6% | | 0.2% | 0.1% | | 1.0% | <0.5% |
| C20:1n-11 | | | | | | 12% | |
| C20:1n-11cis (14-OH) | | | 51.4% | | | | |
| C20:1n-9cis | 1.4% | | 1.2% | 0.1% | | | <0.5% |
| C20:4n-6cis | | | | | | | |
| C20:4w3 | | | | | | | |
| C20:5n-3cis (EPA) | | | | | | | |
| C21:5w3 | | | | | | | |
| C22:0 | 1.3% | | | 0.1% | | 0.4% | <1% |
| C22:1n-9cis | 0.2% | | | | | 22% | |
| C22:5n-3cis | | | | | | | |
| C22:5n-6cis | | | | | | | |
| C22:6n-3cis (DHA) | | | | | | | |
| C24:1n-9cis | | | | | | | |
| Total Saponifiables | 98.6% | | | 101.8% | 99.4% | | |
| Oil content % wt/wt | 42.0% | | 25.0% | | | | |
| Oil $CDN/MT | $720 | $1,980 | | $790 | | | |
| Seed $CDN/MT | $1,320 | | | | | | |
| Seed Oil Content | 42.0% | | | 41.0% | 30.0% | | |
| Phytosterols | 0.53-0.97% | | | | | | |
| Brassicasterol | 0.104% | | | 0.240% | | | |
| Campesterol | 0.207% | | | 0.131% | | | |
| Stigmasterol | 0.004% | | | 0.035% | | | |
| β-Sitosterol | 0.392% | | | 0.273% | | | |
| Δ5-Avenasterol | 0.014% | | | | | | |
| Δ7-Avenasterol | 0.001% | | | | | | |
| Δ7-Stigmasterol | 0.017% | | | | | | |
| Tocopherols | | | | | | | |
| α | 0.027% | | 0.038% | 0.003% | | | |
| β | 0.000% | | | | | | |
| γ | 0.042% | | | | | | |
| δ | 0.000% | | | 0.047% | | | |
| Total Un-saponifiables | 0.8% | | | 0.7% | | | |

| Fatty acid | Palm kernel | Peanut | Sesame | Safflower | Soya | Sunflower |
|---|---|---|---|---|---|---|
| C6:0 | | | | | | |
| C8:0 | 3-4% | | | | | |
| C10:0 | 3-7% | | | | | |
| C12:0 | 46-52% | | | | | |
| C14:0 | 15-17% | | | | 0.1% | |
| C14:1n-5cis | | | | | | |
| C16:0 | 6-9% | 8-13% | 8-11% | 6-7% | 10.8% | 6.2% |
| C16:1n-7cis | | <0.3% | <0.3% | <0.5% | 0.2% | 0.2% |
| C16:4n-3 | | | | | | |
| C18:0 | 1-3% | 1-4% | 4-6% | 2-3% | 4.0% | 4.7% |
| C18:1n-9cis (12-OH) | | | | | | |

TABLE 2-continued

Typical Hydrocarbon Properties of Oil Seeds and Crude Tall Oil Fatty Acids (CTOFAs)

| | | | | | | |
|---|---|---|---|---|---|---|
| C18:1n-9cis | 13-19% | 35-66% | 37-42% | 10-20% | 23.8% | 20.4% |
| C18:1n-7 | | | | | | |
| C18:2n-6cis | 0.5-2% | 14-41% | 39-47% | 68-80% | 53.3% | 68.8% |
| C18:3w6 | | | | | | |
| C18:3n-3cis | | <0.3% | <0.5% | | 7.1% | |
| C18:4n-3 | | | | | | |
| C20:0 | | <2% | <1% | <0.5% | | |
| C20:1n-11 | | | | | | |
| C20:1n-11cis (14-OH) | | | | | | |
| C20:1n-9cis | | <2% | <0.4% | | 0.2% | |
| C20:4n-6cis | | | | | | |
| C20:4w3 | | | | | | |
| C20:5n-3cis (EPA) | | | | | | |
| C21:5w3 | | | | | | |
| C22:0 | | 2-5% | <0.5% | | | |
| C22:1n-9cis | | | | | | |
| C22:5n-3cis | | | | | | |
| C22:5n-6cis | | | | | | |
| C22:6n-3cis (DHA) | | | | | | |
| C24:1n-9cis | | | | | | |
| Total Saponifiables | | | | | 99.5% | 100.3% |
| Oil content % wt/wt | | | | | | |
| Oil $CDN/MT | | | | | | |
| Seed $CDN/MT | | | | | | |
| Seed Oil Content | | | | | | |
| Phytosterols | | | | | | |
| Brassicasterol | | | | | | |
| Campesterol | | | | | | |
| Stigmasterol | | | | | | |
| β-Sitosterol | | | | | | |
| Δ5-Avenasterol | | | | | | |
| Δ7-Avenasterol | | | | | | |
| Δ7-Stigmasterol | | | | | | |
| Tocopherols | | | | | | |
| α | | | | | | |
| β | | | | | | |
| γ | | | | | | |
| δ | | | | | | |
| Total Unsaponifiables | | | | | | |

Trace amounts of the following resin acids and phospholipids were also measured in flax, sesame, canola, mustard, sunflower, cotton, castor, soya, hemp and linseed:

Resin Acids
Abietic ($C_{20}H_{30}O_2$)
Dehydroabietic ($C_{20}H_{28}O_2$)
Palustric ($C_{20}H_{30}O_2$)
Isopimaric ($C_{20}H_{30}O_2$)
Neoabietic ($C_{20}H_{30}O_2$)
Pimaric ($C_{20}H_{30}O_2$)
Phospholipids
N-acylphosphatidylethanolamine
phosphatidic acid
phosphatidylethanolamine
phosphatidylcholine
phosphatidylinositol
lysophosphatidylcholine

TABLE 2A

Typical Hydrocarbon Properties Crude Tall Oil Fatty Acids (CTOFAs)

| Components | | CTOFA (Primary Emulsifier) |
|---|---|---|
| Myristic (n-Tetradecoic acid) | (C14:0) | |
| Palmitic (Hexadecanoic) | (C16:0) | 0.10% |
| Palmitoleic | (C16:1) | |
| Margaric Heptadecanoic | (C17:0) | |
| cis-10Heptadecenoic Acid | | |
| Stearic (n-Octadecanoic Acid) | (C18:0) | 2.00% |
| trans-11 Octadecenoic Acid | (C18:1) | |
| Ricinoleic Acid (glyceryl tricinoleate) | C 18:1-OH | |
| Oleic | (C18:1n9c) | 50.00% |
| Linoleic | (C18:2n6c) | 45.00% |

TABLE 2A-continued

Typical Hydrocarbon Properties Crude Tall Oil Fatty Acids (CTOFAs)

| Components | | CTOFA (Primary Emulsifier) |
|---|---|---|
| Alpha Linolenic | (C18:3) | |
| Gamma Linolenic | (C18:3n6) | |
| Linolenic Acid | (C18:3n3) | |
| Stearidonic | (C18:4) | |
| 9,10-dihydroxy-octadecanoic acid | (C19) | |
| Arachidic (n-Icosanoic Acid) | (C20:0) | |
| Eicosenoic | (C20:1) | |
| cis-11,14-Eicosedienoic Acid | (C20:2) | |
| Gadoleic | (C20:4) | |
| Behenic (n-Docosanoic Acid) | (C22:0) | |
| Erucic (Docosenoic) | (C22:1) | |
| Docosadienoic | (C22:2) | |
| Lignoceric (n-Tetracosanoic Acid) | (C24:0) | |
| Nervonic | (C24:1) | |
| | | 97.10% |
| Total Resin Acid | | 25.00% of total FA fraction is resin acid |
| Abietic | (C20H30O2) | 32.00% |
| Dehydroabietic | (C20H28O2) | 29.00% |
| Palustric | (C20H30O2) | 12.00% |
| Isopimaric | (C20H30O2) | 11.00% |
| Neoabietic | (C20H30O2) | 4.00% |
| Pimaric | (C20H30O2) | 2.00% |

Drilling Fluid Preparation

As is known to those skilled in the art, drilling fluids may be comprised of a wide range of compounds including both a water and oil phase, emulsion stabilizers, seepage control agents, viscosifiers, torque and drag reducing agents, dispersing agents and filtration control agents.

In accordance with one embodiment of the invention, whole oilseeds may be added to the drilling fluid at a concentration of 3 kg/m$^3$ to 150 kg/m$^3$ to engineer the properties of the drilling fluid.

EXAMPLES

Figure 1:
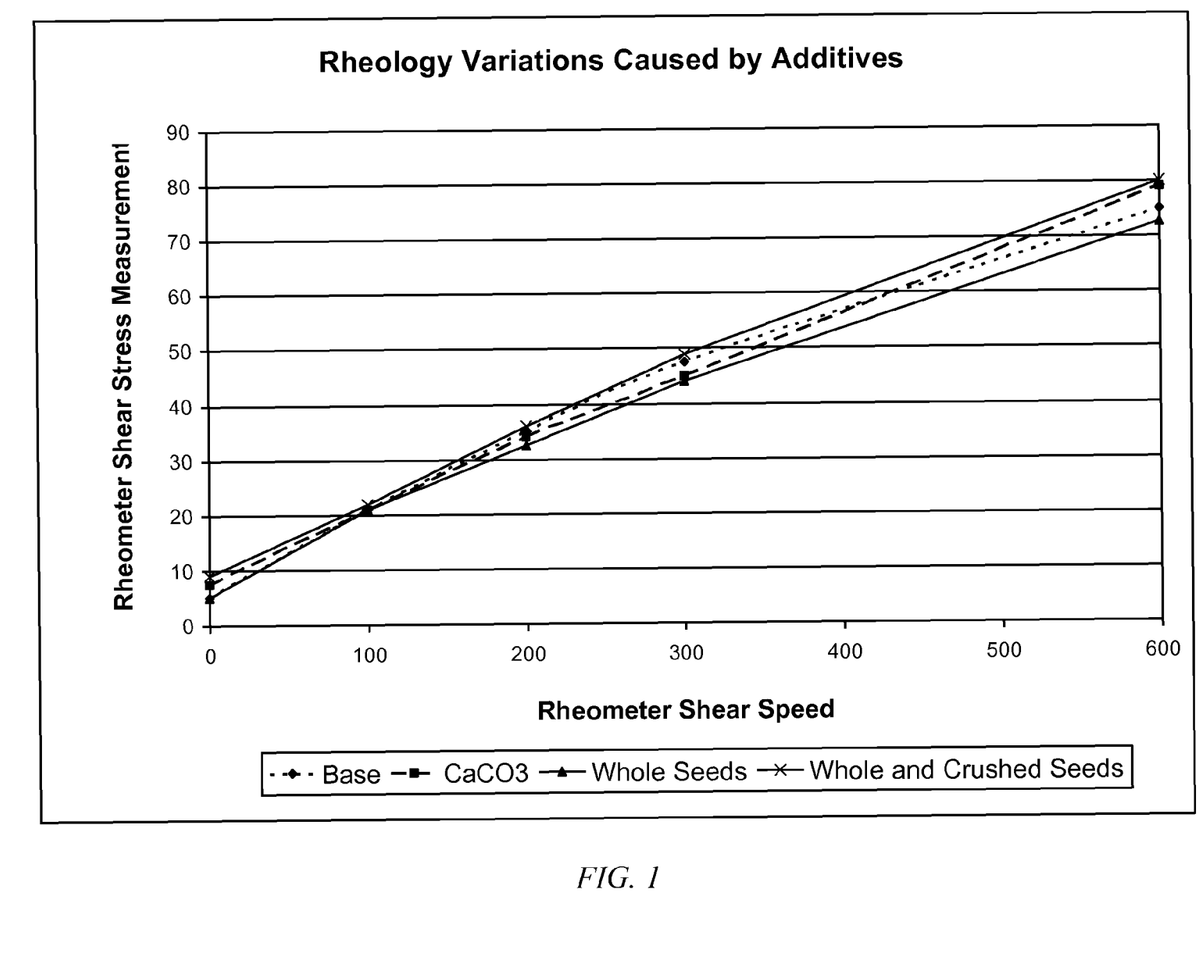
FIG. 1 is a graph showing the change in viscosity for different drilling fluid samples with and without oilseeds.

With reference to Table 3 and FIG. 1, the effectiveness of adding whole oilseeds as a means to alter the properties of a drilling fluid was investigated.

Field-tested invert drilling fluids (samples 1-4) with and without a seepage control agent and with and without oilseeds were compared. Each sample included a base field-tested drilling fluid comprising inter alia an organophilic clay, water, crude tall oil fatty acids, nonyl-phenyl ethoxylate, barite and calcium chloride. The base drilling fluid (Sample #1) was prepared in accordance with procedures known to those skilled in the art and is representative only of a typical drilling fluid.

Sample #2 included the base drilling fluid as well as a known seepage control agent formulation comprising calcium carbonate poultry grit, calcium carbonate fines and calcium carbonate (325 Mesh).

Sample #3 included the base drilling fluid as well as a mixture of oilseeds including canola, mustard and flax seeds.

Sample #4 was identical to sample #2 but included additional crushed canola seed.

Each formulation was subjected to laboratory testing in which the fluid properties of each sample were examined.

TABLE 3

Effect of Oilseeds on Drilling Fluid Parameters

| Measured Parameter Sample # | Units | Cell Base Mud #1 | Cell + CaCO3 #2 | Cell + Seed #3 | Cell + Seed #4 |
|---|---|---|---|---|---|
| Canola Seed | (kg/m$^3$) | | | 14.25 | 14.25 |
| Mustard Seed | (kg/m$^3$) | | | 14.25 | 14.25 |
| Flax Seed | (kg/m$^3$) | | | 14.25 | 14.25 |
| Canola Crushed | (kg/m$^3$) | | | | 14.25 |
| Mustard Seed | (kg/m$^3$) | | | | |
| Flax Seed | (kg/m$^3$) | | | | |
| Calcium Carbonate Poultry Grit | (kg/m$^3$) | | 14.25 | | |
| Calcium Carbonate Fine | (kg/m$^3$) | | 14.25 | | |
| Calcium Carbonate 325 Mesh | (kg/m$^3$) | | 14.25 | | |
| Hot Rolled | Hrs | 18 | 25 | 18 | 25 |
| Hot Rolled | °C. | 121 | 121 | 121 | 121 |
| Rheology Temperature | °C. | 50 | 50 | 50 | 50 |
| Θ 600 | () | 75 | 79 | 73 | 80 |
| Θ 300 | () | 47 | 45 | 44 | 49 |
| Θ 200 | () | 35 | 34 | 33 | 36 |
| Θ 100 | () | 21 | 22 | 21 | 23 |
| Θ 6 | () | 7 | 7 | 7 | 9 |
| Θ 3 | () | 5 | 6 | 5 | 7 |
| Θ 3 @ 10" | () | 8 | 10 | 8 | 9 |
| Θ 3 @ 10' | () | 9 | 17 | 9 | 12 |
| n | () | 0.67 | 0.81 | 0.73 | 0.71 |
| k | N·s/m$^2$ | 0.34 | 0.14 | 0.22 | 0.29 |
| Plastic Viscosity | mPa·s | 28 | 34 | 29 | 31 |
| Yield Point | Pa | 9.5 | 5.5 | 7.5 | 9 |
| PV/YP | Ratio | 3 | 6 | 4 | 3 |
| Gel 10 Seconds | Pa | 4 | 5 | 4 | 4.5 |
| Gel 10' Minutes | Pa | 4.5 | 8.5 | 4.5 | 6 |
| Fluid Density | kg/m$^3$ | 1100 | 1124 | 1078 | 1071 |
| Emulsion Stability @ 30° C. | volts | 1050 | 950 | 1150 | 1260 |

TABLE 3-continued

Effect of Oilseeds on Drilling Fluid Parameters

| Measured Parameter Sample # | Units | Cell Base Mud #1 | Cell + CaCO3 #2 | Cell + Seed #3 | Cell + Seed #4 |
|---|---|---|---|---|---|
| ES Variation from Base Fluid | % | | −9.52% | 9.52% | 20.00% |
| HT-HP Filtrate @ 165° C. & 500 psi | ml | 12 | 14 | 9 | 8 |
| Oil/Water | Ratio | 80/20 | 80/20 | 80/20 | 80/20 |

Discussion

Sample #2—Addition of Known Seepage Control Agent

As expected, the introduction of calcium carbonate caused a deterioration of certain fluid properties including a significant variation in the PV/YP ratio and a corresponding and detrimental increase in 10' (Minute) gels. The emulsion stability (as measured by the voltage required to cause current to flow through the emulsion) caused the emulsion to weaken by 10% as expected due to the consumption of emulsifiers within the system which are consumed by the surface area of the seepage control agent. Further the HT-HP Filtration increased by 16.7%

Sample #3—Addition of Oilseeds

The addition of whole oilseeds produced a smaller variation in the PV/YP ratio in the opposite direction to that of sample 2. In addition, an overall reduction in viscosity was observed and the emulsion stability of the drilling fluid was also observed to have been favorably varied with the addition of these materials. The emulsion stability was observed to improve with the addition of oilseeds by a factor of 10%. As the surface area of the seeds was comparable to the surface area of the calcium carbonate particles within sample #2, the expected result of a loss in emulsion stability due to the consumption of emulsifier by the diluting material was not observed to occur. This result was believed to be caused by the whole oilseeds providing an effective slow release of additional emulsifiers through the seed shell wall (i.e., fatty acids) that imparted additional stability to the emulsion (FIG. 1). There was also an improvement in HT-HP filtration results which were observed to be reduced by 25%.

Sample #4—Addition of Crushed Oilseed

Sample #4 was prepared and tested to verify that the fatty acids contained within the oilseeds were of sufficient concentration to affect the emulsion stability of a drilling fluid. Sample #4 was prepared from sample #3 to which crushed canola seed was added. The evidence of the oilseed effect was immediately verified as the fluid parameters were affected. Interestingly, the negative effects of the comminuted material, i.e. the seed hull detritus affected the properties of the fluid in a negative way as evidenced by the increases measured using the ΘXXX reading between Θ600 and Θ3. In summary, FIG. 1 shows that the addition of whole oilseeds favorably reduces the relative viscosity of the drilling fluid at increasing shear rates. A further reduction of 11.1% in HT-HP was observed.

Other Observations

As shown above, the addition of whole oilseeds to drilling fluids provides an effective parameter to enhance the properties of oil based invert emulsion drilling fluid.

Other observations in relation to the benefits of using whole oilseeds within a drilling fluid are detailed below:

The variation in particle size between these seeds allows for engineering of the drilling fluid to adapt to different sizes of fractures and other loss zones.

The spherical or flat nature of particular oilseeds provides an effective mechanical mechanism for the reduction of rotary torque and drag induced frictional losses.

The oleophilic nature of whole oilseeds minimizes negative effects on the viscosity of the drilling fluid unlike existing hydrophilic materials or crushed oilseeds Whole oilseeds do not alter or impede the operation of surface solids control equipment ensuring that fluid maintenance is not impeded negatively during their use. The steady release of high viscosity oils from the whole oilseeds during circulation in the drilling fluid reduces filter cake permeability, increases the lubricity of the filter cake, increases emulsion stability, and disperses entrained solids. The addition of whole oilseeds may be used to lower the specific gravity of the drilling fluid as opposed to the use of conventional additives such as ground limestone that will increase specific gravity. A reduction in specific gravity will reduce the circulating density or specific gravity of the drilling fluid, which can reduce seepage losses by reducing the hydrostatic pressure of the fluid column (the "chip hold down effect"), as well as increasing drilling penetration rates. It should be noted that comminuted oil seeds will also reduce the specific gravity of drilling fluid, but the viscosity effects will result in increases in pressure needed to circulate the fluid and a corresponding increase in the Equivalent Circulating Density (ECD) of the drilling fluid, thus negating the fluid weight reduction imparted by the seed material.

In all cases listed above, the use of oilseeds provides for a low cost contributive effect to the overall benefit of the drilling fluid, replacing or reducing the requirement for expensive refined chemicals usually required.

The variation in fatty acid constituents of oilseeds allows for the engineering of emulsifiers in an invert emulsion drilling fluid by selection of the seed for its fatty acid. i.e. the presence of C-22 fatty acids in mustard seed may be a more desirous material in an oil based drilling fluid treatment than the use of C-18 from canola or flax seeds.

The addition of the whole seeds to the oil based drilling fluid systems did not result in an increase in the viscosity of the continuous phase as evidenced with sample #3. Normally the addition of cellulose materials and calcium carbonate materials results in a change in the viscosity of the continuous phase and thus places a limit on material addition based on the capability of the pumping system to circulate a drilling fluid slurry. The whole seeds did not have this effect meaning that significantly higher (up to 150 kg/m$^3$) concentration levels can be achieved. It should be noted that even the small amount of crushed seed added in sample #4 had a significant effect on increasing fluid viscosity from sample #3 which had a lower viscosity than the base fluid of sample #1 to a higher viscosity then sample #1.

Highly unsaturated fatty and resin acids caused high degrees of oil wetting in oil based drilling fluids and saturated fatty acids greatly improved the performance of oil based muds (OBMs). Thus, the use of seeds with high amounts of unsaturated fatty acids would be used to disperse or oil wet the solids in OBMs and seeds with more saturated fatty acids would be used to increase emulsion strength and improve organophilic clay performance.

Crushed Oilseeds

As shown in Tables 2 and 2A, oilseeds contain a broader range of fatty acids than CTOFAs. As a result, crushed oilseeds (preferably first press) without detritus provide a basis for a broader range of soaps within an invert emulsion after saponification with a saponifying agent such as a $Ca(OH)_2$ (Lime). As a result, by selection of a specific oilseed oil or controlled blending of two or more oils, controlled creation of soaps can be realized to impart specific properties to a drilling fluid when compared to emulsifiers created from CTOFAs. Moreover, oilseeds are easily blended within a drilling fluid system and do not require intermediary dilution or specialized mixing steps.

Further still, the hydrophilic/lipophilic balance (HLB) of oilseeds is broader than CTOFAs thereby enhancing the ability to create specialized properties within the drilling fluid.

Figure 2:
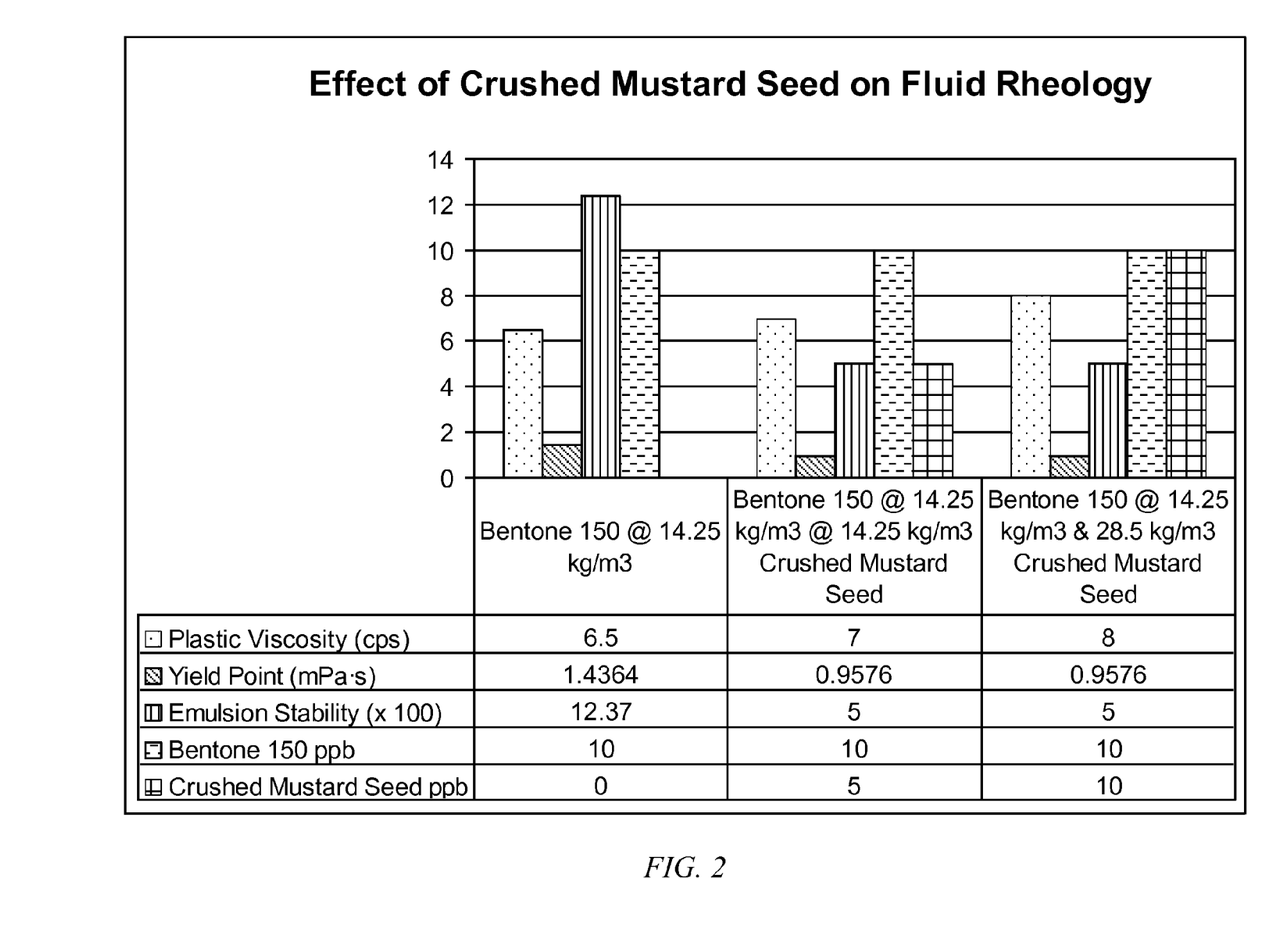
FIG. 2 is a bar graph showing the effect of crushed mustard seed on a drilling fluid containing an organophilic clay; and, FIG. 3 is a graph showing the effect of crushed mustard seed on the rheology of a base drilling fluid.
Figure 3:
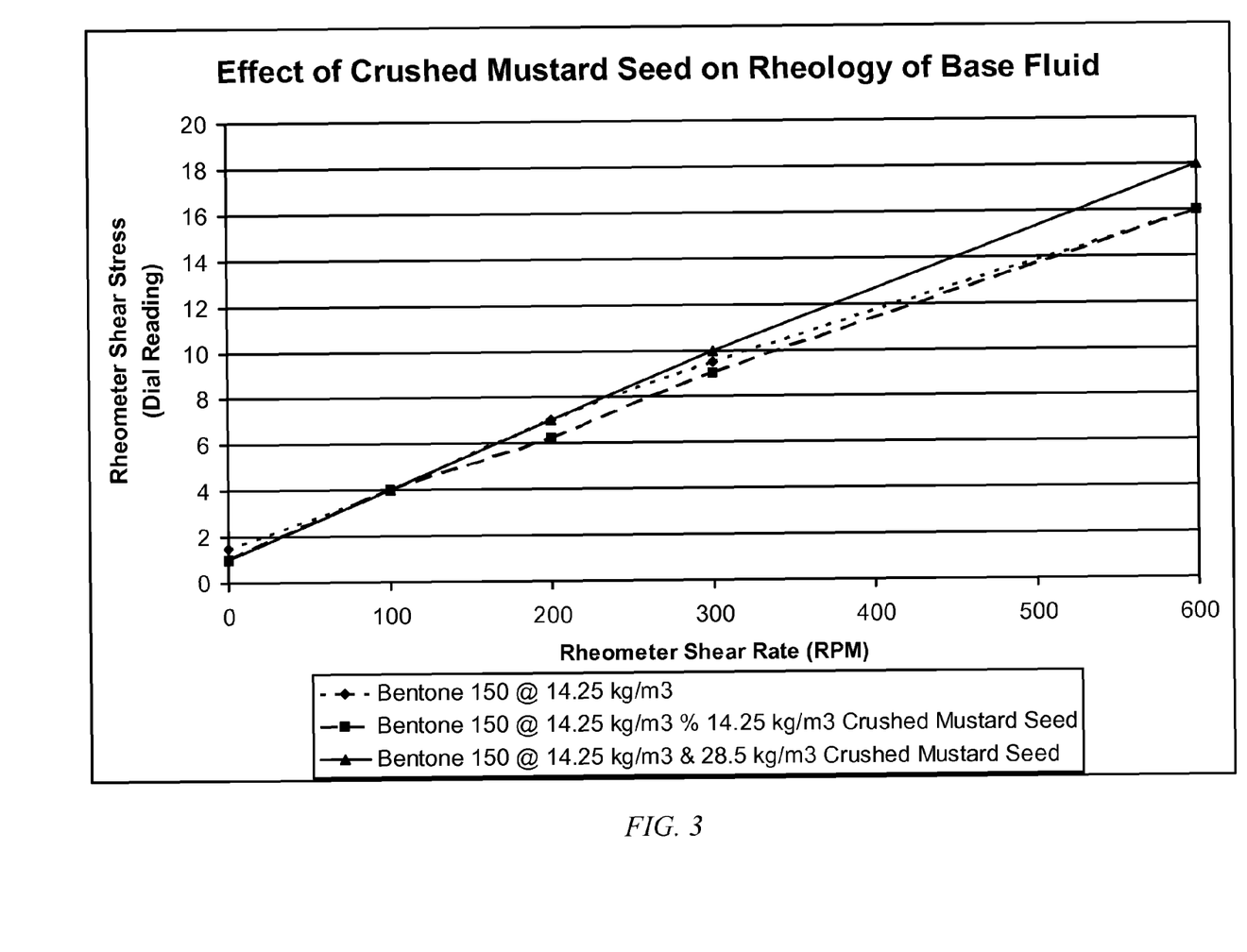

With reference to FIGS. 2 and 3, the effect of adding crushed mustard seed to different drilling fluids is shown in three different drilling fluid compositions containing an organophilic clay (Bentone 150). The drilling fluids examined included a) 14.25 $kg/m^3$ Bentone 150, b) 14.25 $kg/m^3$ Bentone and 14.25 $kg/m^3$ crushed mustard seed and c) 14.25 $kg/m^3$ Bentone and 28.5 $kg/m^3$ crushed mustard seed. As shown in FIG. 2, the plastic viscosity increases with increasing crushed mustard seed concentration and the yield point decreases with increasing crushed mustard seed concentration (combined indication of dispersion affect); in FIG. 3, the shear stress increases with increasing crushed mustard seed concentration thus demonstrating the ability to control these properties of the drilling fluid.

Field Testing

In addition to lab testing, various drilling fluids using whole and crushed seeds were utilized downhole.

During field trials, it was observed that the addition of whole seeds and crushed seeds (independent additions) caused a reduction in rotary torque, namely the amount of energy required to turn the drill pipes during the drilling process as measured by appropriate torque sensors. In addition, an up to 80% drop in the drag or force required to lift or lower the drill pipes out of the hole was observed as measured by appropriate drag weight sensors.

It was also observed that the addition of crushed seeds to the drilling fluid caused an immediate reduction in high temperature/high pressure (HT-HP) filtration just as with the whole seeds as determined in accordance with American Petroleum Institute (API) methodologies.

Table 4 shows a comparison between drilling fluid cost data for six wells drilled with conventional drilling fluids and two wells drilled with drilling fluids incorporating oilseeds. As can be seen, in the wells drilled using drilling fluids with oilseeds, there was significant reduction in total drilling fluid costs compared to drilling fluid costs for comparable wells drilled without oilseeds. In each well the primary emulsifier was CTOFAs and the secondary emulsifier was a polyamide. All wells were drilled in the same geographic location.

TABLE 4

Field data showing drop in product consumption when oil seeds used in OBM

| Product Usage without Oil Seeds | | |
|---|---|---|
|  | Site 1 | Site 2 |
| Primary Emulsifier | 68 | 33 |
| Secondary Emulsifier | 68 | 39 |
| Bentone 150 | 102 | 0 |
| Oil (Losses) | 90 $m^3$ | 104 $m^3$ |
| Programmed cost | $200,000 | $200,000 |
| Total Cost | $198,573.47 | $153,478.04 |
|  | Site 3 | Site 4 |
| Primary Emulsifier | 108 | 64 |
| Secondary Emulsifier | 68 | 64 |
| Bentone 150 | 90 | 136 |
| Oil (Losses) | 93 $m^3$ | 110 $m^3$ |
| Programmed cost | $200,000 | $200,000 |
| Total Cost | $160,562.45 | $180,724.70 |
|  | Site 5 | Site 6 |
| Primary Emulsifier | 75 | 41 |
| Secondary Emulsifier | 52 | 36 |
| Bentone 150 | 42 | 10 |
| Oil (Losses) | 208 $m^3$ | 100.5 $m^3$ |
| Programmed cost | $200,000 | $200,000 |
| Total Cost | $253,726.02 | $193,750.45 |
| Product Usage with Oil Seeds | | |
|  | Site 7 | Site 8 |
| Primary Emulsifier | 41 | 15 |
| Secondary Emulsifier | 40 | 11 |
| Bentone 150 | 0 | 4 |
| Oil (Losses) | 54 $m^3$ | 70 $m^3$ |
| Programmed cost | $200,000 | $200,000 |
| Total Cost | $131,000 | $120,000 |

The invention claimed is:

1. A composition of a drilling fluid comprising:
   an oil base and water;
   canola oilseeds at a concentration within a range from about 3 $kg/m^3$ to about 150 $kg/m^3$ of the drilling fluid;
   organophilic clay; and
   a saponifying agent.

2. The composition of claim 1, wherein the canola oilseeds are whole oilseeds.

3. The composition of claim 1, wherein the canola oilseeds are crushed oilseeds.

4. The composition of claim 1, wherein the canola oilseeds are a mixture of crushed and whole oilseeds.

5. The composition of claim 1, wherein the concentration of the canola oilseeds is within a range from about 10 $kg/m^3$ to about 60 $kg/m^3$.

6. The composition of claim 5, wherein the concentration of the canola oilseeds is about 45 $kg/m^3$.

7. The composition of claim 5, wherein the organophilic clay is at concentration of about 14.25 $kg/m^3$.

8. The composition of claim 1, wherein the saponifying agent is a hydroxide.

9. The composition of claim 8, wherein the saponifying agent is calcium hydroxide.

10. The composition of claim 1, wherein the drilling fluid is an oil-based fluid.

11. The composition of claim 1, wherein the drilling fluid is an invert emulsion.

12. A composition of a drilling fluid comprising:
an oil base and water;
canola oilseeds at a concentration within a range from about 10 kg/m$^3$ to about 60 kg/m$^3$ of the drilling fluid; and
organophilic clay.

13. A composition of a drilling fluid comprising:
an oil base and water;
canola oilseeds at a concentration within a range from about 10 kg/m$^3$ to about 60 kg/m$^3$ of the drilling fluid; and
a saponifying agent.

14. A composition of a drilling fluid comprising:
an oil base and water;
canola oilseeds;
organophilic clay; and
a saponifying agent.

15. The composition of claim 14, wherein the canola oilseeds are whole oilseeds.

16. The composition of claim 14, wherein the canola oilseeds are crushed oilseeds.

17. The composition of claim 14, wherein the canola oilseeds are a mixture of crushed and whole oilseeds.

18. A composition of a drilling fluid comprising:
an oil base and water;
canola oilseeds comprising a C18 fatty acid concentration of greater than 60%;
organophilic clay; and
a saponifying agent.

19. The composition of claim 18, wherein the C18 fatty acid concentration of the canola oilseeds is within a range from about 60.1% to about 91.3%.

20. The composition of claim 18, wherein the C18 fatty acid concentration is greater than 70%.

21. The composition of claim 20, wherein the C18 fatty acid concentration is greater than 80%.

22. The composition of claim 20, wherein the C18 fatty acid concentration is greater than 90%.

23. The composition of claim 18, wherein the canola oilseeds are whole oilseeds.

24. The composition of claim 18, wherein the canola oilseeds are crushed oilseeds.

25. The composition of claim 18, wherein the canola oilseeds are a mixture of crushed and whole oilseeds.

26. The composition of claim 18, wherein a concentration of the canola oilseeds is within a range from about 3 kg/m$^3$ to about 150 kg/m$^3$ of the drilling fluid.

27. The composition of claim 26, wherein the concentration of the canola oilseeds is within a range from about 10 kg/m$^3$ to about 60 kg/m$^3$.

28. A composition of a drilling fluid comprising:
an oil base and water;
palm kernel oilseeds at a concentration within a range from about 3 kg/m$^3$ to about 280 kg/m$^3$ of the drilling fluid;
organophilic clay; and
a saponifying agent.

29. The composition of claim 28, wherein the palm kernel oilseeds are whole oilseeds.

30. The composition of claim 28, wherein the palm kernel oilseeds are crushed oilseeds.

31. The composition of claim 28, wherein the palm kernel oilseeds are a mixture of crushed and whole oilseeds.

32. The composition of claim 28, wherein the concentration of the palm kernel oilseeds is within a range from about 10 kg/m$^3$ to about 60 kg/m$^3$.

33. The composition of claim 32, wherein the concentration of the palm kernel oilseeds is about 45 kg/m$^3$.

34. The composition of claim 32, wherein the organophilic clay is at concentration of about 14.25 kg/m$^3$.

35. The composition of claim 28, wherein the saponifying agent is a hydroxide.

36. The composition of claim 35, wherein the saponifying agent is calcium hydroxide.

37. The composition of claim 28, wherein the drilling fluid is an oil-based fluid.

38. The composition of claim 28, wherein the drilling fluid is an invert emulsion.

39. A composition of a drilling fluid comprising:
an oil base and water;
palm kernel oilseeds at a concentration within a range from about 10 kg/m$^3$ to about 60 kg/m$^3$ of the drilling fluid; and
organophilic clay.

40. A composition of a drilling fluid comprising:
an oil base and water;
palm kernel oilseeds at a concentration within a range from about 10 kg/m$^3$ to about 60 kg/m$^3$ of the drilling fluid; and
a saponifying agent.

41. A composition of a drilling fluid comprising:
an oil base and water;
palm kernel oilseeds;
organophilic clay; and
a saponifying agent.

42. The composition of claim 41, wherein the palm kernel oilseeds are whole oilseeds.

43. The composition of claim 41, wherein the palm kernel oilseeds are crushed oilseeds.

44. The composition of claim 41, wherein the palm kernel oilseeds are a mixture of crushed and whole oilseeds.

45. A composition of a drilling fluid comprising:
an oil base and water;
palm kernel oilseeds comprising a C12 fatty acid concentration of about 46% or greater;
organophilic clay; and
a saponifying agent.

46. The composition of claim 45, wherein the C12 fatty acid concentration of the palm kernel oilseeds is within a range from about 46% to about 52%.

47. The composition of claim 45, wherein the palm kernel oilseeds further comprise a C14 fatty acid concentration of about 14% or greater.

48. The composition of claim 47, wherein the C14 fatty acid concentration of the palm kernel oilseeds is within a range from about 15% to about 17%.

49. The composition of claim 45, wherein the palm kernel oilseeds further comprise a C18 fatty acid concentration of about 13% or greater.

50. The composition of claim 49, wherein the C18 fatty acid concentration of the palm kernel oilseeds is within a range from about 13% to about 19%.

51. The composition of claim 45, wherein the palm kernel oilseeds are whole oilseeds.

52. The composition of claim 45, wherein the palm kernel oilseeds are crushed oilseeds.

53. The composition of claim 45, wherein the palm kernel oilseeds are a mixture of crushed and whole oilseeds.

54. The composition of claim 45, wherein a concentration of the palm kernel oilseeds is within a range from about 3 kg/m$^3$ to about 150 kg/m$^3$ of the drilling fluid.

55. The composition of claim 54, wherein the concentration of the palm kernel oilseeds is within a range from about 10 kg/m$^3$ to about 60 kg/m$^3$.

* * * * *